Patented Feb. 26, 1929.

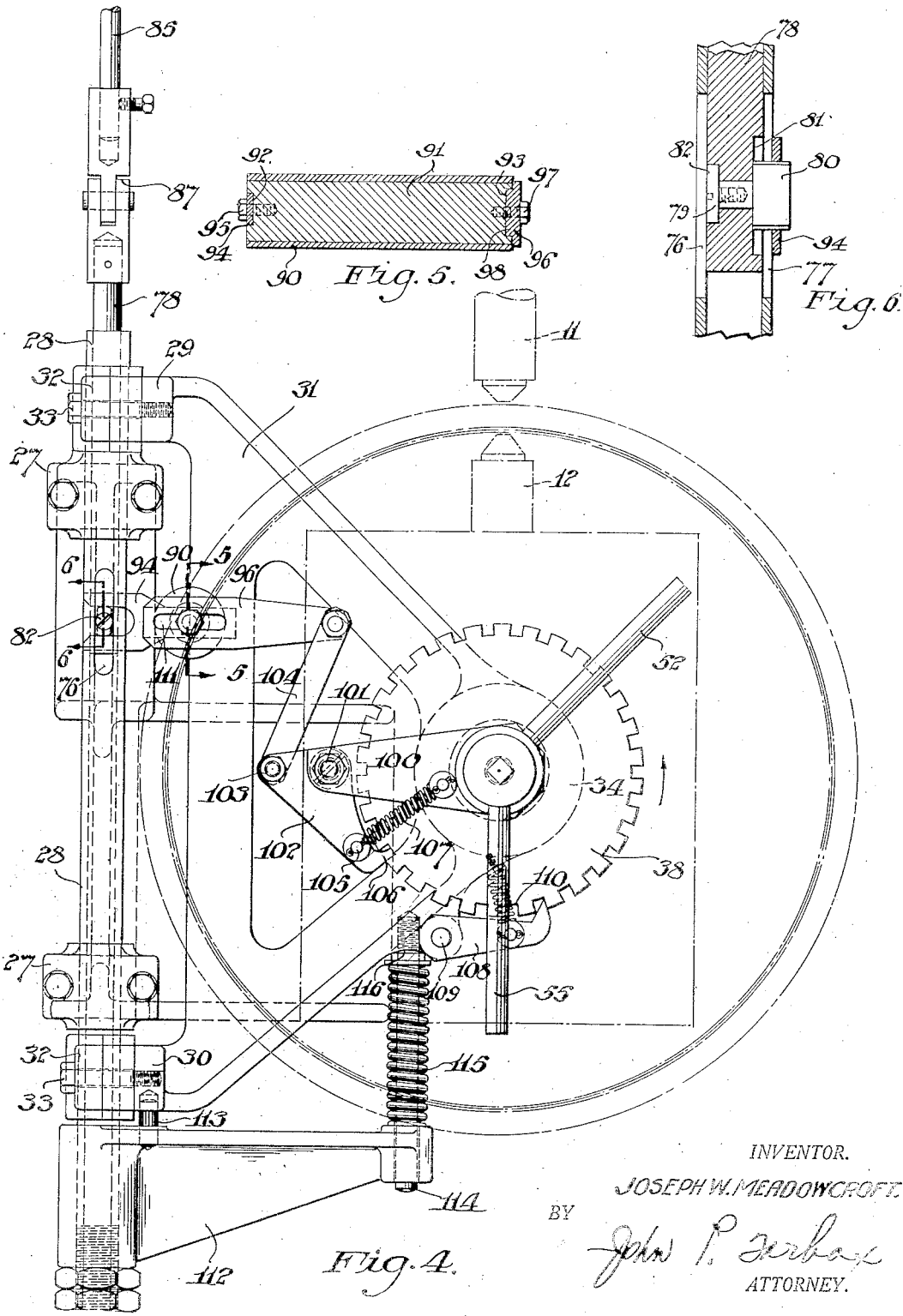

1,703,588

UNITED STATES PATENT OFFICE.

JOSEPH W. MEADOWCROFT, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

MACHINE FOR WELDING WHEELS TO RIMS.

Application filed December 28, 1926. Serial No. 157,439.

This invention relates to a machine for electrically welding metal rims to metal wheels, and more particularly to a spot welding machine for this purpose. In the manufacture of pressed metal wheels, especially of the type known as disc wheels, problems have arisen from time to time with respect to the assembly of the tire supporting rim upon the body of the wheel. Efforts have been made to effect this assembly between rim and wheel in certain instances by riveting the rim upon flanges formed at the outer periphery of the wheel, and in other instances resort has been had to welding the rims to the wheel body by continuous or seam welding. However, these known methods of assembly have proved objectionable from a manufacturing point of view, for obvious reasons. Where the rims are secured to the wheel bodies by riveting, it has been necessary to pierce both the rims and the wheels before the rivets could be inserted, and the respective holes which were so pierced in the rim and wheels had to be, of necessity, in exact and accurate alignment. Such a method of assembly, of course, involved a number of steps in the manufacturing process, and consequently decreased the speed and ease of manufacture of the complete wheel and rim assembly. Where continuous or seam welding was resorted to, it was found necessary to design and use special machinery, which proved expensive, and which took as long, if not longer, to make the complete assembly than in the case where rivets were employed.

One of the primary objects of this invention is to obviate the above-mentioned objections by the use of a machine which is designed to effect the assembly of the wheel and rim with greater facility and efficiency than has ever been heretofore possible.

A still further object of the invention is the provision of a machine for spot welding rims to the peripheral edges of the wheel bodies to produce complete wheel assemblies which partake of those advantages which are inherent in the riveted as well as in the seam welded wheel assemblies without at the same time being subject to those objectionable features in the manufacturing process which are above complained of.

A still further object of the invention is the provision of means associated with spot welding mechanism for rotatably supporting the wheel assembly during the process of welding.

A still further object of the invention is the provision of a means operatively associated with the wheel assembly supporting means and with the welding mechanism for imparting to the wheel assembly a step by step movement in synchronism with the movement of the welding electrodes.

A still further object of the invention is the provision of automatic means for imparting an intermittent movement in one direction to said wheel assembly.

A still further object of the invention is the provision of one or more swinging supports for the wheel assembly supporting means, which supports are arranged to be alternately swung into and out of operative welding position, the arrangement being such as to permit the assembly of the wheel and rim upon said swinging support when the latter is out of welding position.

A still further object of the invention is the provision of means for quickly and efficiently clamping the wheel assembly upon its rotatable support, which means is as readily operable for effecting the release of the wheel assembly after it has been welded together.

A still further object of the invention is the provision of a cam-operated leverage system for imparting a rotary movement to the wheel assembly when the welding electrodes are separated, the arrangement being such that rotative movement is effectually precluded when the welding electrodes are in welding position.

A still further object of the invention is the provision of means for adjusting the degree of rotative movement to vary the number of spot welds as desired.

Other objects of the invention will appear more fully hereinafter.

The invention consists substantially in the construction, combination, location and relative movement of parts, all as will be more fully hereinafter set forth, as shown in the accompanying drawings, and finally pointed out in the appended claims.

In the drawings, Figure 1 is a side elevational view of a spot welding machine showing the general arrangement of the parts associated therewith for effecting rotative movement of the wheel assembly into the various positions desired for welding;

Figure 4 is an enlarged view of the mechanism for supporting the wheel assembly, and shows a portion of the leverage system which is associated therewith for imparting an intermittent rotative movement thereto;

Figure 5 is a detailed cross sectional view, taken on the line 5—5 of Figure 4;

Figure 6 is a detailed cross-sectional view on an enlarged scale taken on the line 6—6 of Fig. 4;

Figure 7 is a cross sectional view of the supporting means and clamping mechanism for the wheel and rim assembly;

Figure 8 is a view taken on line 8—8 of Figure 7 showing the holding blocks in wheel securing position; and Figure 9 is a top plan view of the clamping plate for actuating the holding blocks.

The same part is designated by the same reference numeral whenever it occurs through the several views.

Figure 1:
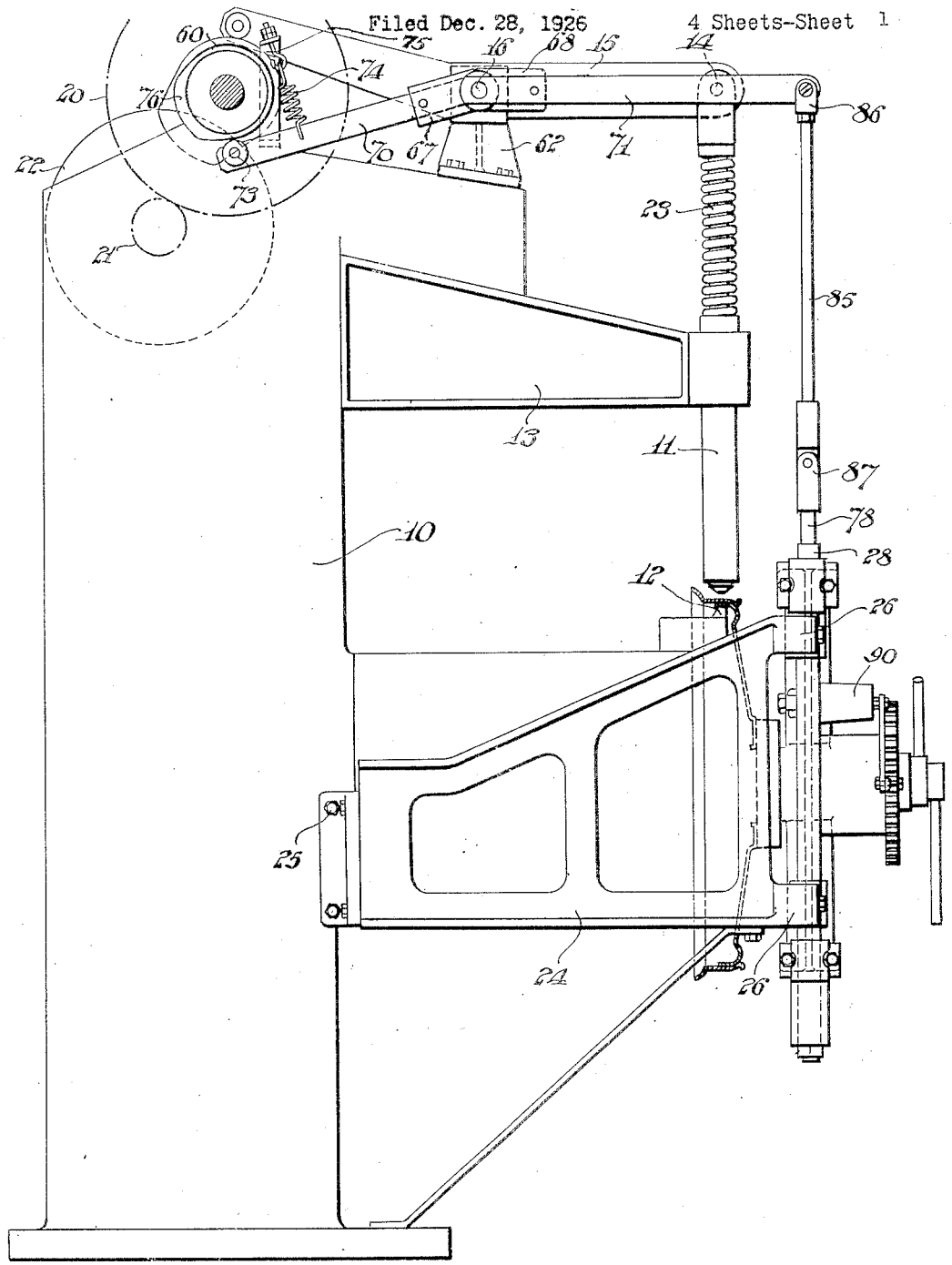

Referring more particularly to the drawings, which drawings illustrate a preferred form of the machine for carrying out the desired objects of this invention, it will be seen that the machine comprises a spot welding mechanism, indicated generally by 10, provided with upper and lower electrodes 11 and 12. The lower electrode 12 of the machine is fixed with respect thereto while the upper electrode 11 is arranged for vertical reciprocation through the arm 13 of the welding machine, and has its upper end pivotally connected as at 14 to the forward end of a lever 15 arranged at the top of the machine. This lever 15 is supported at a point intermediate the forward and rear ends thereof upon a fulcrum 16, the rear end thereof being arranged for engagement by a rotatable cam member 17. This cam member 17 is fixed to and rotates with a main shaft 18, suitably carried in bearings 19—19 mounted upon the top of the welding machine. This shaft 18 extends at one end beyond the side of the welding machine and has secured to this end a gear 20 which is in operative engagement with a pinion 21. This pinion 21 is operatively connected to a pulley 22, the arrangement being such that upon rotation of the pulley 22 by any suitable means a rotative movement will in turn be imparted to the shaft 18 with the result that the cam member 17 will, as it rotates with this shaft 18, engage the rear end of the lever 15 to effect a positive reciprocation of the upper electrode vertically with respect to the lower electrode 12. The electrode 11 and the lever 15 have a movement relative to each other and a compression spring 23 is suitably interposed between the two so that the correct pressure of the welding electrodes upon the work is always obtained. The spring 23 also compensates for any wearing away of the electrodes. Any suitable spring may be interposed between the lever 15 and the frame of the machine to keep the roller on the said lever in contact with cam 17.

Figure 2:
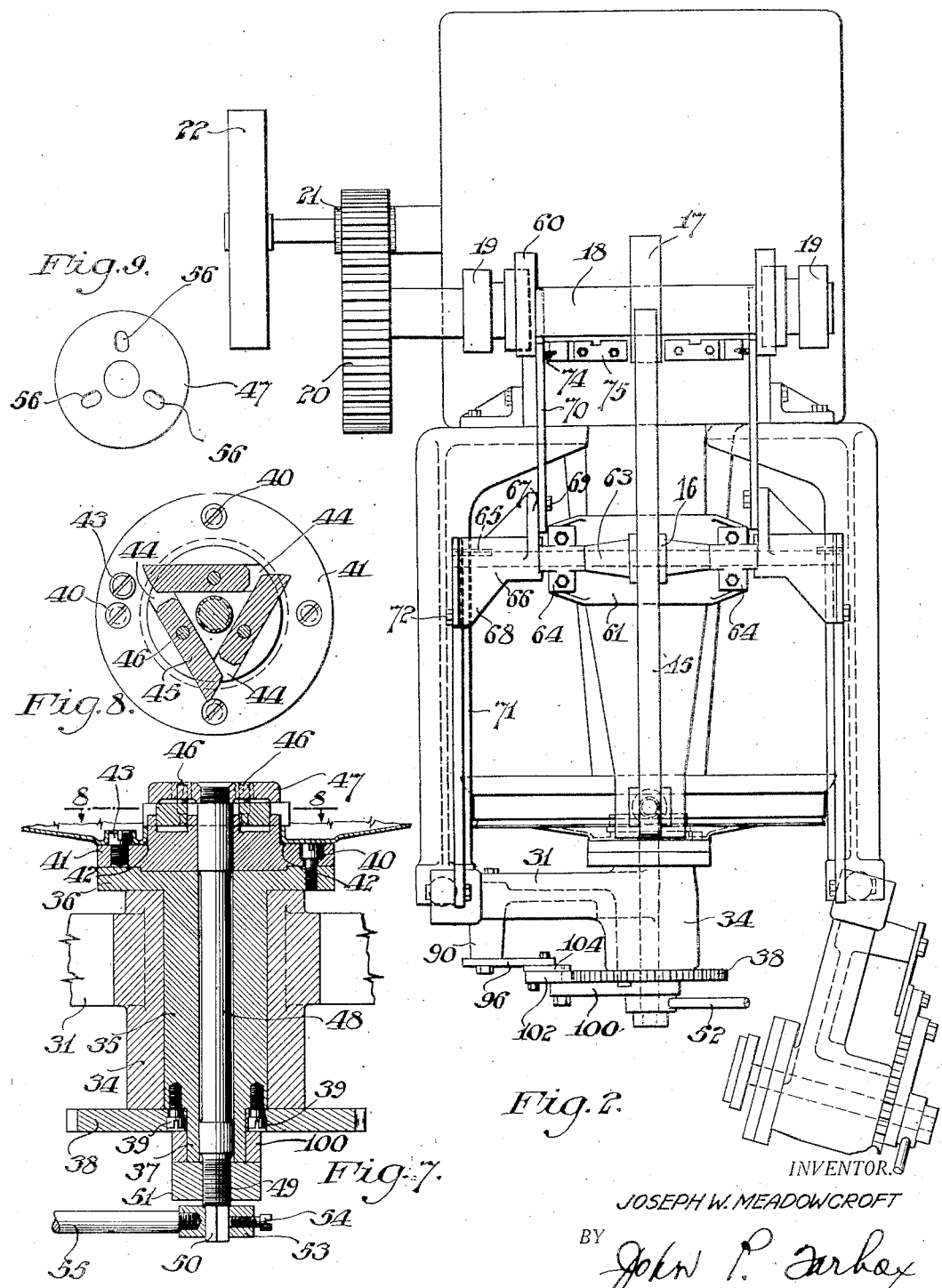
Figure 2 is a top plan view of the machine shown in Figure 1.
Figure 3:
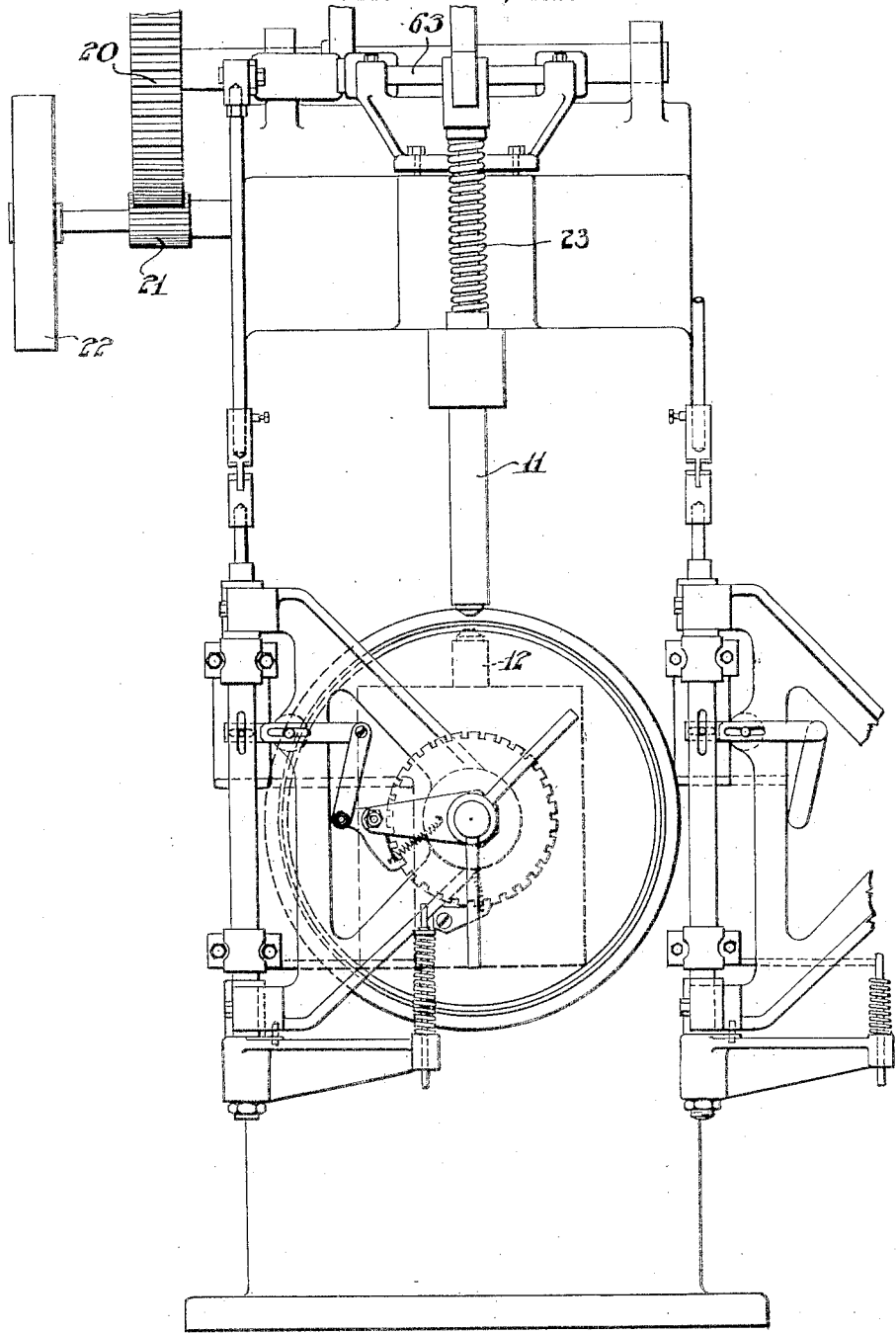
Figure 3 is a front elevational view of the machine shown in Figure 1, showing the wheel assembly in position for welding, the dotted portions of the figure showing an auxiliary mechanism for supporting and intermittently rotating the wheel assembly, this auxiliary mechanism being shown in its inoperative position with respect to the welding mechanism.

Inasmuch as it is within the contemplation of this invention to provide a pair of work supporting mechanisms located on opposite sides of the welding machine proper, and in view of the fact that these mechanisms are substantially similar in all respects, except that one is left-hand and that the other is right-hand, it has been thought advisable for the purposes of this description to describe only one of such work supporting mechanisms. Also, in view of the fact that the means associated with this work supporting mechanism, and through which is imparted a step by step movement to the work as it is supported in welding position, is identical to the auxiliary means employed in the event that a pair of work supporting mechanisms are used, only one such means will be described. In Figures 2 and 3 of the drawings, this auxiliary work supporting means and the means for imparting step by step movement to the work are shown dotted.

Considering now only the left-hand work supporting means and its associated mechanisms, it will be seen that there has been provided a forwardly extending main bracket 24, the rear end of which is securely mounted upon the frame of the welding machine 10 by the bolts 25 or any other suitable securing means. The forward end of this bracket 24 is provided with upper and lower vertically aligned bosses 26, which cooperate with clamping members 27 to hold securely thereby the vertically extending tube 28, this tube 28 extending upwardly to a point just above the upper of the bosses 26 and downwardly a considerable extent below the lower boss 26. Not only do these bosses 26 and their cooperating clamping members 27 serve as means for securing the tube 28 in fixed position, but they also constitute vertically aligned bearings for the upper and lower ends 29 and 30 respectively of the laterally extending bracket 31. Upper and lower bearing blocks 32 embrace the tube 28 on opposite sides of the bearings 26—27 and are secured in any suitable manner, preferably by the bolts 33, to the upper and lower ends 29 and 30 respectively of the bracket 31, the latter being thus arranged for swinging movement about the tube 28 as an axis.

As clearly appears in Figures 3 and 4 of the drawings, the bracket 31 is of substantially triangular outline, the apex of the triangle being laterally removed from the supporting tube 28 and being in the form of a hollow boss 34, the axis of which boss extends substantially at right angles to the plane of the bracket 31. Rotatively supported within this boss 34 is the member 35 constituting the bearing for the wheel and rim assembly to be welded. Referring to that end of this bearing member 35, which is nearest to the wheel assembly, as the rear end, it will be seen that the rear end is provided with a laterally extending flange 36, which overlies to some extent the rear end of the boss 34. The opposite or forward end of the bearing 35 is provided with a portion 37, extending from the forward end of the boss 35, of reduced diameter, and a toothed member 38 is seated against the shoulder formed by this reduced portion and securely held thereagainst by the screws 39. The function of this toothed member 38, and its relation to the other parts of this machine, will be set forth hereinafter.

To the flange 36 of the wheel assembly bearing member 41 is secured, preferably by a plurality of screws 40, the member 41, upon which is directly secured the body of the disc wheel to which the rim is to be welded. This member 41 is of substantially the same diameter as that of the flange 36, and is provided on its rear face with an annular shoulder 42 against which is seated the internal flange of the wheel. A screw 43 is threaded into the rear face of the member 41 with the head thereof protruding and arranged for reception within one of the bolt holes of the wheel so as to prevent any relative rotation between the wheel and its supporting member 41. Of course, a means other than the screw 43 may be provided for similar purpose such as, for instance, an integral lug or other projection. In the rear face of the member 41 and within the circle formed by the annular shoulder 42 are provided a series of slots or grooves 44 arranged substantially in the form of an equilateral triangle. Seated within each of these grooves 44 is a clamping block 45, the form of which may best be seen in Figure 8.

These blocks 45 are in turn each provided with a freely projecting pin 46 and which pins serve as a means for moving the clamping blocks in their respective slots 44. In the position shown in Figure 8, the blocks have each been moved to a position where the bevelled edges thereof overlie the inner edge of the flange of the wheel and so tend to hold the wheel in fixed position with respect to its support 35. In order to insure the maintenance of the clamping blocks 45 in clamping position with respect to the wheel, a clamping plate 47 is provided which is operable, by means of its stem 48 which extends through aligned bores provided in the members 34 and 41. The forward end of this stem is threaded as at 49 and squared as at 50. A nut 51 is threaded upon the threaded portion 49 of the stem by means of a handle 52 to effectively clamp the clamping plate 47 against the blocks 45.

A second nut 53 is secured to the squared end 50 of the stem 48 by means of a set screw 54 and a handle 55 is operatively associated therewith. Upon loosening the nut 51, it is possible by means of this handle 55 to rotate the clamping head 47 which is fixed to the shaft 48. Use is made of this arrangement to operate the clamping blocks 45 by providing a plurality of elongated slots 56 in the clamping head for receiving the free ends of the pins 46. It will thus be seen that when the clamping head is arranged against the blocks 45 with the pins of the latter in engagement with the slots 56 of the clamping head, a rotative movement imparted to the latter in one direction or other will cause a projection or withdrawal, as the case may be, of the outer ends of the blocks 45 for securing the wheel in position upon the member 41 or for permitting the removal of the wheel therefrom.

The mechanism which is here employed for effecting a step-by-step or intermittent movement of the wheel and rim assembly and which movement is synchronized to the reciprocating movement of the welding electrode 11 comprises essentially a plurality of cam operated linkages or levers suitably connected together and operatively associated with the wheel assembly supporting and rotating mechanism. A cam member 60 is fixed to the main shaft 18 and is rotatable therewith simultaneously with the rotation of the cam 17, which is in operative engagement with the lever 15 for reciprocating the electrode 11.

Mounted forwardly of the shaft 18 and its associated parts is a bracket member 61, provided with upstanding arms 62 on opposite sides thereof, the upper ends of which arms constitute the lower bearing elements for the shaft 63. The upper bearing blocks 64 are bolted to the upper ends of these arms 62 and cooperate therewith to constitute complete bearings for supporting the shaft 63. Keyed to the freely extending end of the shaft 63 by a key 65 is a substantially Z-shaped casting 66 having one arm 67 projecting rearwardly of the shaft and another arm 68 forwardly thereof, these arms 67 and 68 being laterally offset with respect to one another. Rigidly secured to the arm 67 of this casting, preferably by means of the bolts 69, is the rearwardly extending and downwardly inclined lever 70, while a similar but oppositely extending lever 71 is rigidly secured to the arm 68 of the casting, preferably by bolts 72.

To the rear end of the lever 70 is secured in any desirable manner a cam roller, which roller is constantly held in contacting engagement with the cam member 60 by the action of the tension spring 74. One end of this spring 74 is connected directly to the free end of the lever 70 while the other end thereof is connected to the upper end of a strap member 75 provided for the purpose. The outline of the working surface of the cam member 60 is best shown in Figure 1 from which it is evident that the roller 73 is actuated by the cam 60 during only a portion of its complete cycle. In other words it is only when the portion 76 of the cam member 60 is in engagement with the roller 73 that any movement is imparted to the lever 70. However, when such engagement is effected and the roller 73 consequently is depressed, the member 66 will be accordingly oscillated, a certain amount depending upon the extent of depression of the roller 73, and the lever 71 will in turn be thrown upwardly.

Now referring to the tubular stem 28 which has been described as being supported at the forward edge of the lower side bracket 24, it will be seen that it is provided with opposed elongated slots or openings 76 and 77. A rod 78 extends downwardly through the upper end of the tubular stem 28 and is provided in its lower end with a transversely extending pin 79 having an elongated head 80 of a width slightly less than that of the slot 77. The pin 79 is drawn transversely through the rod 78 with its head 80 disposed in a groove 81 provided for the purpose in the side of the stem opposite the slot 77 by means of a screw 82. As clearly appears in Figure 6, the head 80 of the pin projects to some extent without the tube 78 and thus provides an efficient means for precluding any relative rotation between the tube 28 and the rod 78 without, at the same time, interfering with the relative vertical movement between these members.

A link or other suitable member 85 is interposed between the rod 78 and the forward end of the lever 71, the connections at the upper and lower ends of this link 85 being of the pivotal forms as generally indicated by reference numerals 86 and 87, respectively. Any movement of the cam roller 73 resulting in a corresponding movement of the lever 71 is thus immediately transmitted to the rod 78 through this link 85.

Having thus far described the principal features of the wheel assembly supporting mechanism and the means for effecting reciprocation of the rod 78 in the tube 28, it still remains to describe the means for translating this reciprocatory movement of the rod 78 to the toothed wheel 38 for effecting that intermittent or step-by-step movement which has been mentioned hereinbefore. For this purpose the swingably mounted bracket member 31 is provided with a laterally extending hollow boss 90 located intermediate the upper and lower ends but substantially in line with the vertical edge thereof. In the bore of this boss 90 is disposed for oscillatable movement a stub shaft 91, the opposite ends of which are provided with recesses 92 and 93 as shown more particularly in Figure 5.

It is to be noted in this connection that the axis of the hollow boss 90 is arranged such that it lies always in the horizontal plane of the axis of the pin 79 when the cam roller 73 is in its normal upper position. That is, except for the period when the cam roller 73 is affected by the portion 76 of the cam 60, the parts are so designed that the longitudinal axes of the boss 90 and the pin 79 lie in the same horizontal plane. The reason for this will appear hereinafter.

A link 94 is employed for effecting the lateral connection which is necessary between the bottom of the rod 78 and the linkage system for actuating the toothed wheel 38. This link 94 is of bifurcated form, the bifurcated end thereof embracing the head 80 of the pin 79. The opposite end of this link 94, which is in the form of a simple extension of the bifurcated portion, is received within the recess 92 of the stub shaft 91 and is securely held therein by the screw 95. It should thus be apparent that any downward movement of the rod 78 will, through this link 94, cause a partial rotation of the stub shaft 91 in its bearing 90. A second link 96 is secured by the screw 97 in somewhat similar manner to the opposite end of the stub shaft 91, the end of the link 96 which is so secured being provided with a raised portion 98 for disposition in the recess 93 of the stub shaft. Any oscillation of the stub shaft 91 will of course cause a corresponding movement at the free end of this second link.

Now referring again to the supporting mechanism for the wheel and rim assembly as shown in Figure 7 it will be seen that the outer end of the rotatable member 35 has oscillatably mounted thereon the laterally extending link member 100. This link member is also clearly shown in Figures 3 and 4. Pivoted at 101 to the free end of this link 100 is a form of bell-crank lever 102, one end 103 of which is joined to the free end of the link 96 by an intermediate link 104. The other end 105 of the bell-crank lever is provided with a dog 106 arranged for engagement with the peripheral slots in the wheel 38, this engagement being normally maintained when the parts are in the relative positions shown in Figure 4 by a tension spring 107. A pawl member 108, suitably pivoted as at 109 upon the swingable bracket 31, is normally held in engagement with the toothed wheel 38 by the tension spring 110 to effectually preclude any possibility of rotation of the wheel 38 in reverse direction.

Synchronism between the step-wise rotary movement of the wheel assembly support and the relative reciprocatory movement of the welding electrodes is of course obtained by properly setting the cams 17 and 60 on their rotating shaft 18. From the foregoing description it will appear that as the cam 60 operates on the lever 70 to lift the rod 78 with the result that the toothed wheel 38 is rotated in counter-clockwise direction through the intermediary of the interconnected links 94, 96, 104 and 102, the cam 17 operates on its lever 15 to raise the upper electrode 11 from the work. The extent of this intermittent travel of the wheel 38 is governed to a great extent by the form of the cam 60 and it also can be varied by longitudinally adjusting the link 96 with respect to the stub shaft 91 by means of the slot 111 which has been provided for this purpose. As soon as the wheel 38 reaches its next final position, which is when the cam roller 73 just slips off the eccentric portion 76 of the cam 60, the spring 74 acts to lift the lever 70 whereupon the rod 78 is depressed and the links 94, 96, 104 and 102 cooperate to unseat the dog 106 against the action of the spring 107. At the same time this last action is taking place, the cam 17 is operating to move the electrode 11 downwardly into welding position with respect to the work, the weld occurring when the dog 106 is unseated and while the wheel 38 is temporarily at rest. When the desired number of welds have thus been made around the periphery of the wheel the bracket 31, which carries the support for the wheel assembly, is swung outwardly out of welding position, the welded unit is removed and a new assembly is mounted in its stead for subsequent welding as just described.

In order that the wheel flange and rim will clear the lower electrode during the rotative movement of the wheel intermediate the weldings, a compression spring 115 is interposed between the bracket 31 and a bracket 112 arranged for rotation upon the lower end of the tube 28 beneath the bearing block 32. This bracket is arranged for swinging movement together with the wheel supporting bracket 31, the two brackets being interconnected for this purpose by the pin 113. The extreme outer end of the bracket 112 is provided with a vertically extending stem 114. Surrounding this stem is the heavy coiled compression spring 115, the upper end of which abuts against a seat 116 formed in the bracket 31 and the lower end of which abuts against the end of the bracket 112. Thus, when the electrodes are separated, the spring 115 will force the bracket 31 upwardly, so that the wheel flange clears the lower electrode.

The mechanism such as has just been described may, as has already been indicated, be duplicated on the opposite side of the welding machine such that one operator might perform the welding operation while another assembles the rim and wheel upon the rotatable support therefor. As soon as the initial assembly has been welded together, it may be swung out of welding position and the other assembly, which is now ready for welding, may be swung into welding position. At the same time, the welded wheel and rim unit may be quickly removed and a new assembly inserted ready for another welding operation. Certainly the arrangement is one which permits a considerable increase in the speed of production as well as in the efficiency thereof. Nor is the invention adapted merely for the purpose of welding metal rims to wheels. While it has been illustrated and described as a machine for this purpose, it is to be clearly understood that certain features of the invention may be used with advantages in connection with the welding of other articles.

Having now set forth the objects and nature of the invention and a construction embodying the principles thereof, what is claimed as new and useful and for which it is desired to secure Letters Patent is:—

1. In a machine of the character described, the combination of a pair of electrodes, means for causing successive approach and separation movements of said electrodes to bring them successively into operative relation with the work, means for rotatably supporting a wheel whose disc and rim are to be welded together with the parts to be welded in proper relation to the electrodes for all rotary positions of the wheel, and reciprocating means for giving the wheel a step-wise movement in synchronism with the movement of the electrodes.

2. In a machine of the character described, the combination of a pair of electrodes, means for causing succesisve approach and separation movements of said electrodes to bring them successively into operative relation with the work, a swinging support for a wheel, rotary means carried by said support, means for clamping a wheel whose rim and disc are to be welded together upon said rotary means, while the support is swung outwardly to its inoperative position, said swinging support permitting the parts of the wheel to be welded to be moved into welding relation to the electrodes after the wheel has been clamped in position, and means for giving the rotary means and the wheel clamped thereon a step-wise movement in synchronism with the movement of the electrodes whereby to permit the welding together of the wheel disc and rim at successive spaced spots on its periphery.

3. In a machine of the character described, the combination of a pair of electrodes, means for causing successive approach and separation movements of said electrodes to bring them successively into operative relation with the work, and a plurality of separately supported work supports movably associated with said electrodes and adapted to be alternatively brought into position with the work mounted thereon in operative relation to the electrodes with a reciprocating movement whereby one support can be unloaded while the work on the other is being operated on.

4. In a machine of the character described, the combination of a pair of electrodes, means for causing successive approach and separation movements of said electrodes to bring them successively into operative relation with the work, a pair of movable supports each adapted to support a wheel whose rim is to be welded to its disc, means carried by said supports to rotatably clamp a wheel thereon, said supports adapted to be alternatively moved with a reciprocating movement into a position to bring the parts of the wheel to be welded into operative relation to the welding electrodes, and means associated with each of said supports for giving the wheel mounted thereon a stepwise movement in synchronism with the movement of the welding electrodes.

5. In a machine of the character described, the combination of welding electrodes, means for causing successive approach and separation movements of said electrodes to bring them successively into operative relation with the work, means for rotatably supporting a wheel whose disc and rim are to be welded together with the parts to be welded in proper relation to the electrodes for all rotary position of the wheel, and means active in one direction and idle in the other for imparting to the wheel an intermittent movement in synchronism with the movement of the electrodes.

6. In a machine of the character described, in combination, a pair of relatively movable electrodes, a rotatable work support adapted to swing in and out of welding position, means for effecting said relative movement between said electrodes, means for partially rotating said work support, and means for effectually precluding said partial rotation of the work support as the electrodes approach one another.

7. In a machine of the character described, in combination, a rotatable shaft, a plurality of cam members rotatable therewith, and a plurality of leverage systems in operative engagement with said cam members respectively whereby to simultaneously impart an intermittent rotary movement to the work to be welded in synchronism with the movement between a pair of welding electrodes.

8. In a machine of the character described, in combination, a pair of relatively movable welding electrodes, a swingably mounted work support arranged for movement into and out of welding position, means for rotatively supporting the work in said swingably mounted support, and means for clamping said work securely in position against displacement.

9. In a machine of the character described, in combination, a bracket mounted upon said machine for swingable movement with respect thereto, said bracket being provided at its free end with a transversely extending bore, a work support rotatably mounted within said bore, means for clamping the work upon said support, and means for intermittently rotating said support.

10. In a machine of the character described, in combination, a pair of relatively movable welding electrodes, a rotatably mounted shaft and a cam rotatable therewith for effecting reciprocation of one of said electrodes, a vertically extending tubular member located to one side of the welding axis of the machine, a work supporting head swingably mounted upon said tubular member, a stem reciprocable within said tubular member by a second cam member rotatable with said rotatable shaft, and means operatively associated with the lower end of said reciprocating stem for imparting a partial rotary movement to said work supporting head.

11. In a machine of the character described, in combination, a supporting bracket extending forwardly of the machine, a tubular stem fixed to the forward vertical edge of said bracket, a second bracket swingably mounted upon said fixed tubular stem, a transversely extending hollow boss on said swingably mounted bracket, a shaft mounted within the hollow of said boss, and means operable within said tubular stem for imparting an oscillatory movement to said shaft.

12. In a machine of the character described, a wheel supporting member, a plurality of reciprocating members for said machine, one of said members carrying an electrode adapted to cooperate with a second electrode for welding, another of said members actuating a pawl and ratchet mechanism adapted to impart a step-by-step rotative movement to said wheel supporting member, said last named member adapted to support a wheel and rim in position to be welded by said electrodes.

13. In a welding machine, a pair of relatively movable electrodes, a bracket swingably mounted on the frame of said machine, a wheel supporting member rotatably mounted on said bracket, means for releasably clamping a wheel on said wheel supporting member, a pawl and ratchet mechanism associated with said wheel supporting member for imparting a step-by-step movement thereto, a second pawl coacting with said bracket to prevent rotative movement in one direction of said wheel supporting member while said electrodes are in welding position, said bracket adapted to swing said wheel into and out of welding position.

14. In a welding machine, relatively movable electrodes, a plurality of swingably mounted brackets therefor, a wheel supporting member rotatably mounted on each of said brackets, means for releasably clamping a wheel on each of said supporting members, a pawl and ratchet mechanism associated with each of said supporting members for imparting a step-by-step movement thereto, a second pawl coacting with each of said brackets to prevent rotative movement in one direction of each of said wheel supporting members while said electrodes are in welding position, each of said brackets adapted to swing the wheel mounted thereon into and out of welding position.

15. In a welding machine, a work supporting member rotatably mounted on a movably mounted bracket, means for imparting a step-by-step movement to said work supporting member comprising a ratchet fixed with respect to said member, a lever rotatably mounted on said member and having associated therewith a pivotally mounted pawl and means for actuating said pawl to move said ratchet intermittently comprising a reciprocating member having a projection thereon operatively connected to said pawl.

16. In a welding machine, a work supporting member rotatably mounted with respect to said machine, said member having means for clamping the work thereon comprising slidably mounted blocks on one end of said member and a rotatable shaft extending through and operable from the other end of said member for actuating said blocks, said shaft having means thereon for preventing rotative movement thereof.

17. In a welding machine, a work supporting member rotatably mounted with respect to said machine, said member having means for clamping the work thereon comprising movably mounted blocks, pins on said blocks and a rotatably mounted clamping plate having elongated apertures therein, said pins adapted to extend into said apertures, whereby said blocks are moved into or out of clamping position upon rotative movement of said clamping plate.

In testimony whereof I hereunto affix my signature.

JOSEPH W. MEADOWCROFT.